US009366568B2

(12) United States Patent
Brosinger

(10) Patent No.: US 9,366,568 B2
(45) Date of Patent: Jun. 14, 2016

(54) METHOD AND APPARATUS FOR ASSESSING A QUALITY OF A HEADLIGHT

(71) Applicant: Audi AG, Ingolstadt (DE)

(72) Inventor: Manuel Brosinger, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 302 days.

(21) Appl. No.: 13/969,081

(22) Filed: Aug. 16, 2013

(65) Prior Publication Data

US 2014/0049639 A1  Feb. 20, 2014

(30) Foreign Application Priority Data

Aug. 18, 2012 (DE) .................. 10 2012 016 441

(51) Int. Cl.
*G01M 11/00* (2006.01)
*G01J 1/42* (2006.01)
*G01M 11/06* (2006.01)

(52) U.S. Cl.
CPC ............ *G01J 1/4257* (2013.01); *G01M 11/062* (2013.01); *G01M 11/064* (2013.01)

(58) Field of Classification Search
CPC .. G01M 11/062; G01M 11/064; G01J 1/4257
USPC .......................................... 348/143; 382/104
See application file for complete search history.

(56) References Cited

U.S. PATENT DOCUMENTS

| 2,003,797 | A |   | 6/1935 | Arbuckle |   |
|---|---|---|---|---|---|
| 5,193,894 | A |   | 3/1993 | Lietar et al. |   |
| 5,321,439 | A | * | 6/1994 | Rogers ................ | G01M 11/064 348/135 |
| 6,091,833 | A | * | 7/2000 | Yasui et al. .................... | 382/104 |
| 6,373,378 | B1 | * | 4/2002 | Ewerhart et al. ........... | 340/425.5 |
| 2007/0080289 | A1 |   | 4/2007 | Theiss et al. |   |
| 2012/0039579 | A1 | * | 2/2012 | Esposito ....................... | 386/224 |

FOREIGN PATENT DOCUMENTS

| CN | 86104318 A | 12/1987 |
| CN | 1710399 A | 12/2005 |
| CN | 101065653 A | 10/2007 |
| CN | 102323044 A | 1/2012 |
| DE | 2 201 199 | 7/1973 |
| DE | 41 22 531 A1 | 1/1993 |
| DE | 43 22 917 | 4/1994 |
| DE | 10 2007 049 619 | 4/2009 |
| DE | 10 2010 033 351 | 2/2012 |
| DE | 10 2011 109 440 | 4/2012 |
| EP | 1 640 700 A1 | 3/2006 |
| GB | 1 562 259 | 3/1980 |

(Continued)

OTHER PUBLICATIONS

Chinese Search Report issued in counterpart Chinese patent application No. 2013103577567 on Jun. 3, 2015.

(Continued)

*Primary Examiner* — Jeffery Williams

(74) *Attorney, Agent, or Firm* — Henry M. Feiereisen LLC

(57) ABSTRACT

In a method of assessing a quality of a headlight of a motor vehicle during travel or operation on a shake bench facility, operation of the headlight is monitored by a camera. A camera image or a chronological sequence of camera images is evaluated as a function of at least one predefined criterion, such as, e.g., a brightness distribution.

10 Claims, 1 Drawing Sheet

(56) References Cited

FOREIGN PATENT DOCUMENTS

| | | |
|---|---|---|
| JP | H08-15093 | 1/1996 |
| JP | 08075607 A * | 3/1996 |

OTHER PUBLICATIONS

English translation of Chinese Search Report issued in counterpart Chinese patent application No. 2013103577567 on Jun. 3, 2015.

* cited by examiner

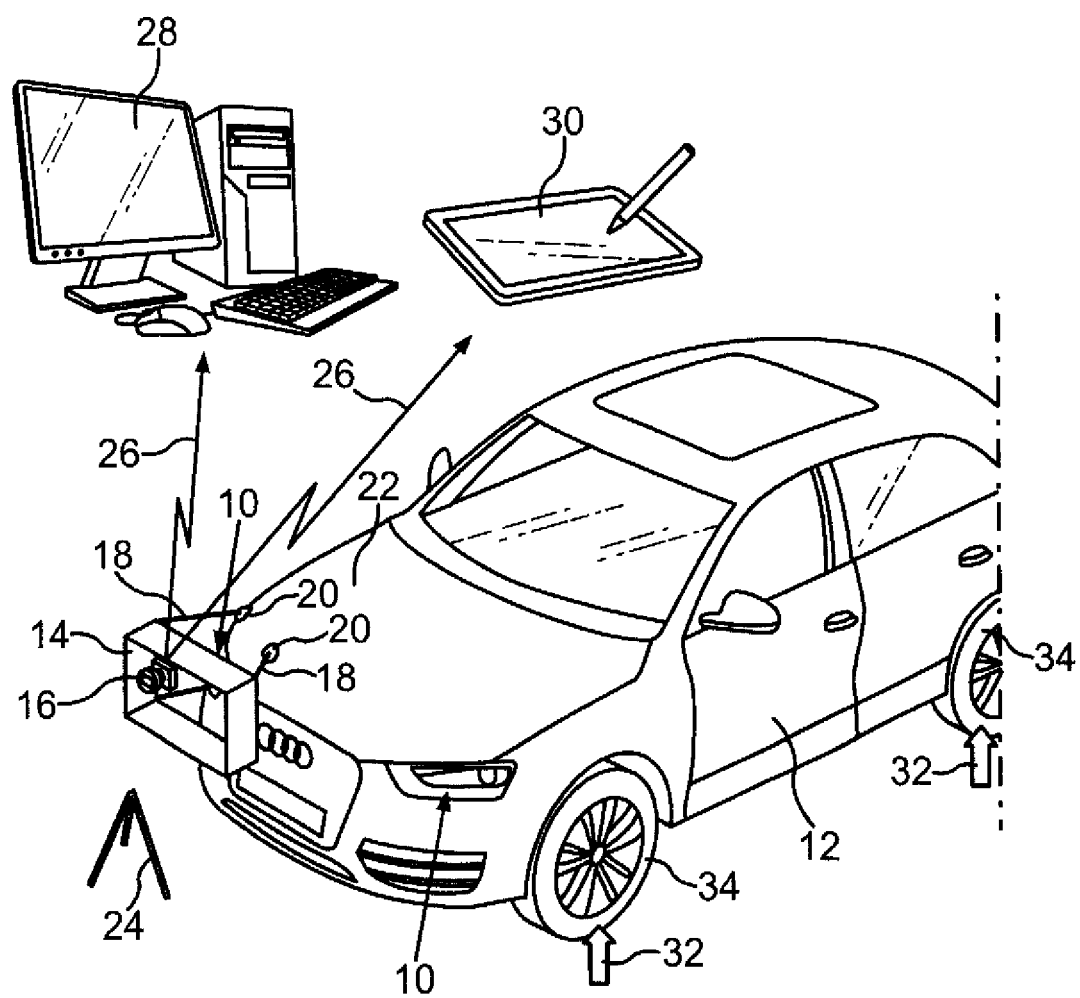

METHOD AND APPARATUS FOR ASSESSING A QUALITY OF A HEADLIGHT

CROSS-REFERENCES TO RELATED APPLICATIONS

This application claims the priority of German Patent Application, Serial No. 10 2012 016 441.6, filed Aug. 18, 2012, pursuant to 35 U.S.C. 119(a)-(d), the content of which is incorporated herein by reference in its entirety as if fully set forth herein.

BACKGROUND OF THE INVENTION

The present invention relates to a method and apparatus for assessing a quality of a headlight of a motor vehicle.

The following discussion of related art is provided to assist the reader in understanding the advantages of the invention, and is not to be construed as an admission that this related art is prior art to this invention.

When assessing the quality of headlight, certain criteria such as uniform light distribution, tendency to flicker, and stability of the light-dark boundary of the headlight have to be evaluated. Normally, such an evaluation can not be implemented in a static state because vibration, introduced for example by the engine and chassis into the headlight, significantly impacts the afore-mentioned factors. For example, when xenon headlamps are involved, resonant oscillations may be encountered in the light arc as a result of vibrations, causing unwanted flickering.

Evaluation is therefore typically executed while the motor vehicle is traveling, with vibratory excitation being oftentimes enhanced by running on a vibration track. The actual assessment is provided qualitatively by the driver or an observer standing outside the motor vehicle. This approach does not provide quantifiable data about the headlight quality so that a comparison between different types of headlights or of the quality of the same headlight in different motor vehicles is hardly possible.

It would therefore be desirable and advantageous to provide an improved method and apparatus for assessing a quality of a headlight of a motor vehicle to obviate prior art shortcomings.

SUMMARY OF THE INVENTION

According to one aspect of the present invention, a method of assessing a quality of a headlight of a motor vehicle during travel or operation on a shake bench facility includes monitoring the headlight using a camera, and evaluating a camera image or a chronological sequence of camera images as a function of at least one predefined criterion.

A method according to the present invention enables a quantitative quality control which yields reliable information about the quality of the headlight while driving, irrespective of a subjective perception of a driver or observer. In particular, dynamic changes of the light quality during travel, as experienced for example as a result of external vibratory excitation, can be reliably ascertained and qualified. Aside from an improved quality control of individual headlights, a method according to the present invention provides a reproducible and quantitative comparison of different types of headlights and/or vehicle types in terms of their light quality. Quantitative evaluation on the basis of measurement data also permits a precise comparison with predefined desired values.

According to another advantageous feature of the present invention, the at least one predefined criterion can be a brightness distribution. Brightness distribution is normally independent on external vibratory excitations so that this evaluation can be implemented already on the basis of a single camera image. As quantitative measure, a difference in brightness between the darkest and brightest image areas may, for example, be provided.

According to another advantageous feature of the present invention, the at least one predefined criterion can be a change in time of a brightness or brightness distribution. In this way, dynamic effects, like for example the afore-mentioned arc flickering can be ascertained, quantified, and analyzed.

According to another advantageous feature of the present invention, each camera image can be subdivided into a predefined number of subimages, and a brightness of the subimages can be determined for ascertaining the brightness distribution. As a result, the accumulating amount of data can be reduced compared to a pixel-type analysis.

According to another advantageous feature of the present invention, for a chronological sequence of the subimages, for each subimage a minimum, mean value, and maximum of the brightness can be determined for a predefined time period. The variation in time of these parameters constitutes a quantitative measure for the flickering of each subimage.

According to another advantageous feature of the present invention, the at least one predefined criterion can be a location of a light-dark boundary of the headlight. The light-dark boundary is influenced by vibrations of the headlight suspension. When the location of the light-dark boundary varies excessively, other road users may still be blinded, even though the headlight is correctly adjusted. Quantitative evaluation enables intervention of constructive measures to prevent this situation.

According to another aspect of the present invention, an apparatus for assessing a quality of a headlight of a motor vehicle during travel or operation on a shake bench facility includes a light box secured to the motor vehicle at a location to ensure a radiation of the headlight into the light box, a camera accommodated in the light box, and a computer for evaluating image data captured by the camera.

Such an apparatus is capable of carrying out the afore-described method and yields the afore-stated benefits. Advantageously, the apparatus is detachably secured by using suction cups or the like so that the apparatus can easily be attached to different types of motor vehicles to be tested. Integration of the computer permits evaluations during the test drive and to check results so that the parameters for the test drive can be adjusted if need be or the headlights can be readjusted.

The presence of the light box also allows execution of measurements during daylight as opposed to subjective observations that could normally only be carried out at nighttime.

According to another advantageous feature of the present invention, the camera and the computer can be connected by wireless communication for transmission of image data captured by camera to the computer. Examples of a computer include notebooks, PDAs (Personal Digital Assistant), or tablets inside the motor vehicle so that the measured data is made immediately available to the driver.

According to another advantageous feature of the present invention, the computer can be constructed for evaluating the image data as a function of at least one predefined criterion and for display of an evaluation result that characterizes the quality of the headlight. The predefined criteria may hereby include those described above with reference to the method according to the invention. The immediate evaluation and display, for example in the form of brightness curves or false color renderings of the camera image which accentuate areas of high tendency to flicker, enable the test driver to immediately adjust test conditions to produce data that becomes especially meaningful.

According to another advantageous feature of the present invention, the camera can be constructed for an image capture rate of at least 200 images per second. In this way, flickering of the headlight can be reliably ascertained in a range which normally occurs in xenon lights.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIG. 1 shows a schematic illustration of an exemplary embodiment of an apparatus according to the present invention for executing a method of assessing the quality of a headlight of a motor vehicle.

DETAILED DESCRIPTION OF PREFERRED EMBODIMENTS

The depicted embodiment is to be understood as illustrative of the invention and not as limiting in any way. It should also be understood that the FIGURE is not necessarily to scale and that the embodiment is sometimes illustrated by graphic symbols, phantom lines, diagrammatic representations and fragmentary views. In certain instances, details which are not necessary for an understanding of the present invention or which render other details difficult to perceive may have been omitted.

Turning now to the FIGURE, there is shown a schematic illustration of an exemplary embodiment of an apparatus according to the present invention for executing a method of assessing the quality of a headlight 10 of a motor vehicle 12 under dynamic excitation. A light box 14 is attached to the motor vehicle 12 by struts 18 which are provided with suction cups 20 for securement of the light box 14 to the exterior of the motor vehicle 12. The light box 14 accommodates a camera 16 which is directed towards the headlight 10. In this way, the headlight 10 can be monitored during a test run. The camera 16 is supplied with power during the test by a not shown battery.

As an alternative, the light box 14 may also be positioned on a tripod in front of the motor vehicle 12 such as to capture the headlight 10 so that test bench measurements can be executed on a shake bench facility in a simplest manner.

Image data captured by the camera 16 is transmitted by wireless communication, e.g. by Bluetooth, to the respective computer 28, 30, involving, e.g. a typical desktop PC 28 for test bench measurements and a tablet, laptop or PDA 30 for test runs.

When the camera 16 involves a black and white camera, raw data is generated at a rate of about 1 megabyte/min. Thus, the wireless transmission may optionally be realized by an Ethernet connection when bench tests are involved.

As the quality of the headlight 10 is greatly impacted by external excitation, forces are periodically exerted during the test in the direction of arrows 32 onto the wheels 34 of the motor vehicle 12. This can be realized by driving on a vibration track or shake bench facility.

An important quality criterion for the headlight 10 involves its tendency to flicker. Flickering of the headlight 10 can be triggered especially in xenon lights as a result of resonant oscillations in the arc as a result of external vibration excitation. The frequency of flickering ranges typically from 10 to 40 Hz so that about 200 images/min have to be captured by the camera 16 to provide a reliable determination.

To generate a quantitative measure for flickering tendency, the single images of the camera 16 are divided by the computer 28, 30 into segments. For example, a separation into 40×30 segments may be appropriate for a camera resolution of 1280×960. For each segment, the mean, maximum, and minimum brightness is continuously determined in time periods of e.g. 0.2. seconds. A quantitative flicker value can be determined for each segment on the basis of the chronological profile. The thus acquired flicker data can then be displayed continuously by the computer 28, 30, for example as false color rendering of the gray image of the camera 16 so that the test driver or test bench operator receives continuously detailed information about the flickering of the headlight 10.

Besides arc flickering, an external vibration excitation may also trigger mechanical vibrations of components of the headlight 10. This, in turn, may lead to a shift of the light-dark boundary of the headlight 10, causing inadvertent blinding of approaching road users during normal road traffic.

To detect such shifts, the computer 28, 30 initially ascertains the light-dark boundary in a camera image. When the location of the boundary is known, the camera 16 can then be controlled by the computer 28, 30 in such a way that only a narrow strip is captured around the light-dark boundary. The chronological profile of the location of the light-dark boundary can then again be analyzed by the computer 28, 30, with the intensity of vibrations in the frequency range from 10 to 40 Hz being determined in particular. These intensities may then be represented again as quantitative measure for the shifting of the light-dark boundary as false color rendering of the gray image by the camera 16.

A further option for use resides in the measurement of the uniformity of the light distribution of the headlight 10. For that purpose, a static, high-resolution image is captured by the camera 16 and sent to the computer 28, 30. Uniformity can be quantified in the form of a tonal curve or the like as a function of the difference between minimum and maximum brightness.

A method according to the present invention provides a reliable and reproducible quality control of headlights 10 for use as quality control during large scale production and as validation of constructive measures.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A method of assessing a quality of a headlight of a motor vehicle during travel or operation on a shake bench facility, comprising:

taking the motor vehicle to travel or to operate on a shake bench facility;

monitoring the headlight using a camera during the travel of the motor vehicle or the operation of the motor vehicle on the shake bench facility; and evaluating a camera image of the headlight or a chronological sequence of camera images of the headlight obtained during the travel of the motor vehicle or the operation of the motor vehicle on the shake bench facility as a function of at least one predefined criterion.

2. The method of claim 1, wherein the at least one predefined criterion is a brightness distribution.

3. The method of claim 1, wherein the at least one predefined criterion is a change in time of a brightness or brightness distribution.

4. The method of claim 2, further comprising subdividing each camera image into a predefined number of subimages, and determining a brightness of the subimages, for ascertaining the brightness distribution.

5. The method of claim 4, further comprising determining for a chronological sequence of the subimages for each subimage a minimum, mean value, and maximum of the brightness for a predefined time period.

6. The method of claim 1, wherein the at least one predefined criterion is a location of a light-dark boundary of the headlight.

7. Apparatus for assessing a quality of a headlight of a motor vehicle, comprising:
  a light box secured to the motor vehicle at a location to ensure a radiation of the headlight into the light box;
  a camera accommodated in the light box and monitoring the headlight during the travel of the motor vehicle or the operation of the motor vehicle on the shake bench facility; and
  a computer for evaluating image data of the headlight captured by the camera during the travel of the motor vehicle or the operation of the motor vehicle on the shake bench facility.

8. The apparatus of claim 7, wherein the camera and the computer are connected by wireless communication for transmission of image data captured by the camera to the computer.

9. The apparatus of claim 7, wherein the computer is constructed for evaluating the image data as a function of at least one predefined criterion and for display of an evaluation result that characterizes the quality of the headlight.

10. The apparatus of claim 7, wherein the camera is constructed for an image capture rate of at least 200 images per second.

* * * * *